United States Patent [19]

Nielinger et al.

[11] Patent Number: 4,670,487

[45] Date of Patent: Jun. 2, 1987

[54] STABILIZED RED PHOSPHORUS AND THE USE THEREOF FOR FLAMEPROOF, THERMOPLASTIC POLYAMIDE MOULDING COMPOSITIONS

[75] Inventors: Werner Nielinger; Dietrich Michael, both of Krefeld; Heinz-Josef Füllmann, Leichlingen; Rudolf Binsack; Harald Selbeck, both of Krefeld, all of Fed. Rep. of Germany

[73] Assignee: Bayer Aktiengesellschaft, Leverkusen, Fed. Rep. of Germany

[21] Appl. No.: 836,300

[22] Filed: Mar. 5, 1986

[30] Foreign Application Priority Data

Mar. 16, 1985 [DE] Fed. Rep. of Germany ....... 3509568

[51] Int. Cl.[4] .............................................. C08K 1/60
[52] U.S. Cl. .................................... 524/80; 524/401; 524/514; 523/205; 523/208; 523/210; 252/609; 260/DIG. 24
[58] Field of Search ................. 252/609; 524/80, 401, 524/514; 523/205, 208, 210; 260/DIG. 24

[56] References Cited

U.S. PATENT DOCUMENTS

| | | | |
|---|---|---|---|
| 4,115,522 | 9/1978 | Staendeke et al. | 524/80 |
| 4,188,313 | 2/1980 | Cerny et al. | 524/80 |
| 4,193,907 | 3/1980 | Tacke et al. | 524/80 |
| 4,208,317 | 6/1980 | Cerny et al. | 523/205 |
| 4,356,282 | 10/1982 | Largman | 524/80 |
| 4,405,732 | 9/1983 | Chao et al. | 524/83 |
| 4,493,913 | 1/1985 | Hirobe et al. | 523/205 |
| 4,559,372 | 12/1985 | Giroud-Abel | 524/80 |

FOREIGN PATENT DOCUMENTS

2308104 8/1974 Fed. Rep. of Germany ........ 524/80

*Primary Examiner*—John Kight
*Assistant Examiner*—Kriellion Morgan
*Attorney, Agent, or Firm*—Connolly and Hutz

[57] ABSTRACT

Pulverulent red phosphorus stabilized with zinc fluoride and the use thereof as flame-retarding agent to thermoplastic moulding compositions.

8 Claims, No Drawings

STABILIZED RED PHOSPHORUS AND THE USE THEREOF FOR FLAMEPROOF, THERMOPLASTIC POLYAMIDE MOULDING COMPOSITIONS

This invention relates to flameproof thermoplastic polyamide moulding compounds which have been rendered flame-resistant by means of red phosphorus stabilized with zinc fluoride.

The use of red phosphorus as flame-retarding agent for thermoplastic polyamides is known. Under unfavourable conditions, e.g. at elevated temperatures or in the presence of moisture, red phosphorus tends to decompose into hydrogen phosphide and acids of mono- to penta-valent phosphorus. Attempts have therefore been made to prevent the release of toxic hydrogen phosphide. This is achieved according to DOS No. 2,308,104 by the addition of certain metal compounds and according to DOS No. 2,703,052 by the addition of magnesium or aluminium salts of a chelate-forming aminoacetic acid. Phosphorus may also be stabilized by covering it with binders, such as waxes or metal soaps (DOS No. 2,408,488) or polymers, such as phenol/formaldehyde resins (DAS No. 2,625,673, DOS No. 2,734,103) or polyesters (DOS No. 2,754,515). According to the teaching of DAS No. 2,745,076, cadmium oxide in particular has proved to be a satisfactory additive for enveloped phosphorus. According to another proposal (DOS No. 2,827,760), salts of aluminium, zinc, lead, magnesium, calcium, tin or antimony of polymers containing carboxyl groups may be used for stabilization. The preparation of these products is, however, difficult and expensive and the stabilizing effect of these systems is not always satisfactory. Moreover, the use of these substances, in paticular some of the heavy metal compounds, is not always toxicologically acceptable.

It has now been found that execellent stabilization of red phosphorus may be achieved using zinc fluoride so that the disadvantages mentioned above do not occur. Virtually no hydrogen phosphide is formed during the preparation and working-up of the stabilized polyamides and the quantity of acids of phosphorus formed is so small that it does not impair the electrical properties of the polyamide, such as the resistance to tracking current and to light arcs. This is all the more surprising since zinc chloride is not suitable for long term stabilization owing to its hydroscopic character and solubility in water. Moreover, zinc chloride readily causes stress cracking in the presence of water. The stabilization of phosphorus against the formation of hydrogen phosphide in accordance with the present invention is also surprising on account of the fact that other fluorides favour the formation of hydrogen phosphide.

The present invention this relates to pulverulent red phosphorus which is stabilized with zinc fluoride against thermo-oxidative decomposition and disproportionation into hydrogen phosphide and acids of mono- to penta-valent phosphorus. The present invention further relates to thermoplastic polyamides containing the stabilized red phosphorus according to the present invention as flame-retardant.

Sufficient stabilization of red phosphorus is generally achieved using from 1 to 30%, by weight, preferably from 3 to 15%, by weight, of zinc fluoride, based on the quantity of red phosphorus The zinc fluoride may be mixed mechanically with the finely divided red phosphorus or it may be precipitated on the phosphorus particles in the process of its formation in the presence of a phosphorus slurry. Alternatively, the stabilizer may be directly added to the polymer melt while the phosphorus is being incorporated in the synthetic resin.

The red phosphorus used as flame-retardant should generally have an average particle size of below 200 $\mu$m, preferably below 100 $\mu$m.

The present invention also relates to thermoplastic polyamide moulding compositions containing from 0.5 to 15%, by weight, preferably from 1 to 8%, by weight of red phosphorus and zinc fluoride for stabilization in the quantities indicated above.

The zinc fluoride may be prepared, for example, by precipitation of a zinc salt with hydrogen fluoride or some other fluoride. Precipitation may also be carried out in the presence of a suspension of red phosphorus so that the phosphorus becomes enveloped by the zinc fluoride. The stabilized phosphorus may in addition be enveloped with a layer of, for example, phenol/formaldehyde resins or epoxide resins.

Suitable polyamides include in particular aliphatic polyamides, such as polycaprolactam, poly(hexamethylene adipic acid amide), poly(aminoundecanamide) and polylauric lactam; homo- and co-polyamides of dicarboxylic acids, such as adipic acid, azelaic acid, sebacic acid, decane dicarboxylic acid, terephthalic acid or isophthalic acid, and diamines, such as hexamethylene diamine, trimethylhexamethylene diamine, bis-(4-aminocyclohexyl)methane, and bis-(4-aminocyclohexyl)-propane-(2,2) and copolymers of these momoners with lactams. The flame-retarding finish according to the present invention is particularly suitable for polyamide-6 and polyamide-6,6.

The thermoplastic polyamide moulding compositions according to the present invention can be prepared by mixing the components in conventional commercial extruders or kneaders. The flame-retarding agent which has been stabilized as described above may be incorporated in the thermoplast either directly or in the form of a concentrate. The red phosphorus and the stabilizer may be worked-up separately to form thermoplast concentrates or the two components may be added separately directly to the thermoplast.

The phosphorus may be prestabilized using some other metal compounds, e.g. using from 0.3 to 3% of magnesium oxide, aluminium oxide, lead oxide or zinc oxide, or using a phlegmatizing agent, e.g. 0.05 to 1% of paraffin oil or a high boiling ester.

The stabilized, flameproofed polyamides may contain the conventional additives and auxiliary agents, such as one or more fillers, in particular glass fibres in quantities of 10 to 60%, by weight, based on the total mixture. Other fillers and reinforcing materials which may be used include microglass beads, chalk, various types of quartz, such as novaculite, or silicate, such as asbestos, feldspar, mica, talcum or wollastonite, or kaolin in a calcined or non-calcined from. Dyes and pigments may also be included, in particular carbon blacks and/or nigrosin bases, as well as stabilizers, processing auxiliaries, dust binding agents, and impact strength modifiers, such as those based on copolymers of ethylene, poly(meth)acrylates and grafted polybutadienes.

The thermoplastic moulding compositions can be processed by the known methods of injection moulding or extrusion. The flameproofed moulded polyamide products are particularly suitable for use in the electrical and motor vehicle industry, for example for the production of housings and covers for technical apparatus and instruments, such as domestic electrical appliances and for parts of motor cars.

EXAMPLE 1

A mixture of polyamide-6,6 having a relative viscosity of 2.9 determined using a 1% by weight solution in m-cresol at 25° C., 10% by weight of red phosphorus (in the form of a 20% by weight concentrate in polyamide-6,6) and the stabilizer is heated to 280° C. (bath temperature) with stirring under a nitrogen atmosphere for 30 minutes. The initial mixture has a moisture content of 0.2% by weight in all the experiments.

The hydrogen phosphide formed in the course of the reaction is passed into a 2% by weight aqueous mercury-2 chloride solution with a stream of nitrogen and determined acidimetrically from the hydrogen chloride formed, in accordance with the equation $$PH_3 + 3\ HgCl_2 = P(HgCl)_3 + 3\ HCl.$$

To determine the quantity of acids soluble in water, 35 g of the polyamide heated to 280° C. is extracted for 16 hours with water at 95° C. The whole extract is made up to 200 ml. The pH and the phosphorus content of this solution are determined.

The quantity of hydrogen phosphide formed, the pH and the phosphorus content of the extract are shown in Table 1 in dependence upon the stabilizer content.

The quantity of hydrogen phosphide is based on 50 g of the phosphorus-containing polyamide, and the quantity of phosphorus in the extract is based on 35 g of polyamide.

TABLE 1

| Example | Stabilizer | Quantity (%, by wt.) | $PH_3$ (mg) | Extract pH | Phosphorus (MG) |
|---|---|---|---|---|---|
| 1 | Zinc fluoride | 0.32 | 1.9 | 3.45 | 3.4 |
| 2 | Zinc fluoride | 0.62 | 1.6 | 4.15 | 1.2 |
| 3 | Zinc fluoride | 0.95 | 1.6 | 3.75 | 1.6 |
| 4 | Zinc fluoride | 1.3 | 1.1 | 4.0 | 1.1 |

EXAMPLE 2

Polyamide moulding compounds are prepared from a mixture of 50 parts by weight of polyamide 6,6 having a relative viscosity of 2.9, 25 parts by weight of a 20% by weight phosphorus concentrate in polyamide 6,6 and 25 parts by weight of glass fibres with the addition of various quantities of stabilizer in a double shaft extruder, Model ZSK 83 of Werner and Pfleiderer, at a mass temperature of 280° C. and a throughput of 50 kg/h. To test for the stability of the phosphorus in the polyamide melt, the polyamides freed from soluble phosphorus compounds by extraction are dried and heated to 280° C. for 30 minutes. The hydrogen phosphide formed, the pH values and the phosphorus contents of the extracts are entered in the following Table.

| Stabilizer | Quantity (%, by wt.) | $PH_3$ (mg) | Extracts pH | Phosphorus (mg) |
|---|---|---|---|---|
| none | | 0.6 | 3.2 | 11.0 |
| Zinc fluoride | 0.25 | 0.1 | 4.3 | 3.2 |
| Zinc fluoride | 0.5 | not detectable | 4.7 | 2.8 |

We claim:

1. Pulverulent red phosphorus stabilized with 1 to 30% by weight of zinc fluoride, based on the quantity of red phosphorus.

2. Red phosphorus as claim 1 which is stabilized with from 2 to 15%, by weight, of zinc fluoride, based on the quantity of red phosphorus.

3. A polyamide moulding composition which contains stabilized red phosphorus as claimed in claim 2.

4. A polyamide moulding composition which contains red phosphorus as claimed in claim 1 in amounts of from 0.5–15% by weight, based on the composition.

5. A polyamide moulding composition which contains red phosphorus as claimed in claim 1 in amounts from 1–8% by weight, based on the composition.

6. A composition as claimed in claim 1 which is reinforced.

7. A composition as claimed in claim 1 which is reinforced with glass fibers.

8. A polyamide moulding composition which contains stabilzed red phosphorus as claimed in claim 1.

* * * * *